US008818035B2

(12) United States Patent
 Nozaki

(10) Patent No.: US 8,818,035 B2
(45) Date of Patent: Aug. 26, 2014

(54) IMAGE TARGET IDENTIFICATION DEVICE, IMAGE TARGET IDENTIFICATION METHOD, AND IMAGE TARGET IDENTIFICATION PROGRAM

(75) Inventor: Takeo Nozaki, Tokyo (JP)

(73) Assignee: NEC Corporation, Tokyo (JP)

( * ) Notice: Subject to any disclaimer, the term of this patent is extended or adjusted under 35 U.S.C. 154(b) by 189 days.

(21) Appl. No.: 13/508,187

(22) PCT Filed: Nov. 5, 2010

(86) PCT No.: PCT/JP2010/069656
§ 371 (c)(1),
(2), (4) Date: May 4, 2012

(87) PCT Pub. No.: WO2011/055772
PCT Pub. Date: May 12, 2011

(65) Prior Publication Data
US 2012/0213411 A1 Aug. 23, 2012

(30) Foreign Application Priority Data
Nov. 5, 2009 (JP) .................................. 2009-254350

(51) Int. Cl.
*G06K 9/00* (2006.01)
*H04N 5/33* (2006.01)

(52) U.S. Cl.
USPC ........................... 382/103; 382/291; 348/164

(58) Field of Classification Search
CPC ............. G06K 9/00; G06T 5/008; H04N 5/33
USPC ......... 382/100, 103, 106–107, 155, 162–173, 382/181, 199, 203, 209, 225, 232, 254, 274, 382/276, 291, 305, 312, 217; 358/1.9; 348/164

See application file for complete search history.

(56) References Cited

U.S. PATENT DOCUMENTS

| 6,993,184 | B2 * | 1/2006 | Matsugu | 382/173 |
| 7,170,632 | B1 * | 1/2007 | Kinjo | 358/1.9 |
| 2004/0066970 | A1 * | 4/2004 | Matsugu | 382/217 |
| 2010/0329548 | A1 * | 12/2010 | Yoshimura | 382/164 |
| 2012/0249801 | A1 * | 10/2012 | Nozaki | 348/164 |

FOREIGN PATENT DOCUMENTS

| JP | 8-079632 A | 3/1996 |
| JP | 2001-056860 A | 2/2001 |
| JP | 2001-184510 A | 7/2001 |
| JP | 2002-310940 A | 10/2002 |
| JP | 2003-296728 A | 10/2003 |
| JP | 2006-041744 A | 2/2006 |
| JP | 2007-322374 A | 12/2007 |
| JP | 2010-014482 A | 1/2010 |

* cited by examiner

*Primary Examiner* — Seyed Azarian
(74) *Attorney, Agent, or Firm* — Sughrue Mion, PLLC

(57) ABSTRACT

A device is provided with a luminance histogram calculation unit which generates a luminance histogram showing appearance frequency of luminance values contained within the infrared image and determines a luminance value corresponding to a peak in the luminance histogram as a background luminance level of the background; a luminance shift calculation unit which sets the background luminance value as an intermediate value in luminance range width of the infrared image and generates a luminance shift image by linearly shifting other luminance values in the infrared image based on the intermediate value; a reversed image processing unit which generates a reversed shift image wherein the luminance level of the luminance shift image is reversed; and a luminance calculation processing unit which generates a calculation-processed image by performing calculation processing based on the difference in the luminance values at corresponding positions in the luminance shift image and the reversed shift image.

9 Claims, 11 Drawing Sheets

IMAGE TARGET IDENTIFICATION DEVICE, IMAGE TARGET IDENTIFICATION METHOD, AND IMAGE TARGET IDENTIFICATION PROGRAM

TECHNICAL FIELD

The present invention relates to an image processing device which outputs an image in which a captured target object such as a navy ship, a flying object, or the like can be visually recognized by performing image processing on an infrared image.

BACKGROUND ART

For searching a salvage and probing a flying object by aircrafts, pilots perform searching (probing) of a rescue boat on the sea surface and the flying object by radio wave signals by a beacon such as a distress call, searching by visual inspection while flying over a searching sea area at a low altitude, searching based on an infrared camera image, etc.

In particular, the visibility and the viewing field become poor in nighttime and in a case of bad weather compared to searching done in a fine weather and in daytime. Thus, it is difficult to find the target object such as the salvage floating on the sea surface, the flying object, or the like by searching with the naked eyes and to capture it as an image detectable by an infrared camera.

This causes a delay in finding the search target, which may result in increasing the risk of allowing intrusions of suspicious characters such as navy ships and aircrafts of other countries.

For this, there have been developed an image information processing technique and an image identification support technique which effectively support viewing field searching by a prober through generating viewing field support information (image) for supporting a searcher to identify/discover the target object at an early stage by improving a contrast in the captured infrared image.

For example, known are: an infrared camera reduced in size through omitting a cooling function, which captures infrared images by a non-cooled infrared sensor in which the S/N ratio for a noise is improved largely; an image processing system using such infrared camera; and the like.

Further, as a related technique, there is disclosed an infrared image processing system which captures an infrared image by loading a small-sized non-cooled infrared camera on an aircraft or a flying object, processes the acquired infrared image, extracts/identifies the target object from the infrared image, and displays it (Patent Document 1).

Patent Document 1 separates infrared rays made incident from a target and from the background of the target into plan polarized light rays orthogonal to each other, receives the infrared rays by an image sensor in which two light receiving elements are arranged two-dimensionally, converts the infrared rays into electric signal amounts, and outputs a polarized light difference image signal acquired by finding a difference between electric signal amounts at a same coordinate position on two-dimensional coordinate between each of the image signals outputted after being converted into the electric signal amounts.

Further, a binary image signal acquired by binarizing the electric signal amount of the polarized light difference image signal based on a comparison with a threshold value is outputted by a combination of a polarized image capturing device which outputs a luminance image signal acquired by adding the electric signal amounts at the same coordinate position on the two-dimensional coordinate, and a threshold value database which stores a combination of the target and the background and the threshold value of the polarized light difference image signal with which the target and the background can be separated in a corresponding manner.

Further, a target candidate is extracted by an image that is acquired by multiplying the value after performing binarization on the binarized image signal to the electric signal amount of a luminance image signal at the same position on the two-dimensional coordinate.

The invention depicted in Patent Document 1: uses the fact that there is a temperature difference in a target object and the background thereof in general when extracting the target such as floating object floating on the sea surface, a ship, a flying object in an airspace, and an obstacle of a low visibility in a low airspace; includes an optical system constituted with a surface deflection light receiving element which separates into P-wave and S-wave loaded in front of an infrared ray sensor; includes an appropriate captured image luminance calculation processing unit; and performs infrared image processing which extracts a target object by defining a point that is equal to or more than a prescribed temperature (luminance) as the target object.

Patent Document 1: Japanese Unexamined Patent Publication 2007-322374

However, with the invention depicted in Patent Document 1 described above, it is difficult to reduce the size since the optical system for separating into the P-wave and S-wave before the infrared ray sensor is a large-scaled structure.

Further, the background noise in the infrared captured image captured by an infrared sensor becomes large in a case where the temperature difference between a target and the background thereof becomes small when the background is heated partially by the sun light or the like or in a case where the noise such as the sea spray on the water surface is extensive. Thus, the contrast between the target object and the background cannot be acquired depending on the optical system, so that it becomes difficult to recognize/capture the target correctly. This results in having such inconvenience that the target object is misrecognized or overlooked.

Further, in cases where there are white-crested waves generated due to the bad weather or artificial sea sprays and the like generated by hovering of a helicopter, the target object shown in an infrared captured image is covered by the white-crested waves. Thus, the shape of the target appears different. Therefore, when the target object identification is done by image identification based on the infrared captured image, it is possible to cause such inconvenience that the target object is overlooked or a wrong target object is selected (screening).

Furthermore, when different background regions such as a sea area (sea surface part) as the background of the target object, a fair part, a cloudy part, and the like in an airspace are contained in a captured infrared image, the contrast between the target object and the background cannot be improved according to each background region. Thus, the target object with respect to the background region becomes more indistinct, so that it is possible to cause such inconvenience that the target object is misrecognized or overlooked.

An object of the present invention is providing an image target identification device, an image target extraction method, and an image target extraction program for improving the inconveniences of the related technique and performing image processing so as to securely identify the target object within an infrared image.

DISCLOSURE OF THE INVENTION

In order to achieve the foregoing object, the image target identification device according to the present invention is an optical unit which collects infrared rays from a filming target containing a target object and acquires a specific wavelength band from the collected infrared rays; a non-cooled infrared image sensor which generates an infrared image corresponding to a temperature of the filming target based on the wavelength acquired by the optical unit; and an image processing unit which generates a calculation processed image in which the target object is displayed with emphasis based on the infrared image, wherein the image processing unit is characterized to include: a luminance histogram calculation unit which generates a luminance histogram showing appearance frequency of luminance values of pixels contained within the infrared image; a background luminance level setting unit which sets a luminance value corresponding to a peak value of the appearance frequency in the luminance histogram as a background luminance level which shows a luminance level of a background in the infrared image; a luminance level adjusting unit which sets the background luminance level to an intermediate value of a luminance range width of the infrared image, and generates a luminance shift image in which each of other luminance values in the infrared image is shifted linearly by maintaining a contrast relation with respect to the background luminance level that is set to the intermediate value; and a luminance calculation processing unit which generates a reversed shift image in which the luminance level of the luminance shift image is reversed, and generates the calculation processed image by performing calculation processing based on a difference in the luminance values of respective corresponding pixels of the reversed shift image and the luminance shift image.

Further, the image target identification method according to the present invention is a method which collects infrared rays from a filming target containing a target object and generates a calculation processed image in which the target object is displayed with emphasis based on an infrared image generated from the collected infrared rays based on a temperature of the captured object, and the method is characterized to include: generating a luminance histogram showing appearance frequency of luminance values of pixels contained within the infrared image; setting a luminance value corresponding to a peak value of the appearance frequency in the luminance histogram as a background luminance level which shows a luminance level of a background in the infrared image; setting the background luminance level to an intermediate value of a luminance range width of the infrared image, and generating a luminance shift image in which each of other luminance values in the infrared image is shifted linearly by maintaining a contrast relation with respect to the background luminance level that is set to the intermediate value; generating a reversed shift image in which the luminance levels of the luminance shift image is reversed; and generating the calculation processed image by performing calculation processing based on a difference in the luminance values of respective corresponding pixels of the reversed shift image and the luminance shift image.

Furthermore, the image target identification program according to the present invention is a program for collecting infrared rays from a filming target containing a target object and generating a calculation processed image in which the target object is displayed with emphasis based on an infrared image generated from the collected infrared rays based on a temperature of the captured object, and the program is characterized to cause a computer to execute: a luminance histogram calculation function which generates a luminance histogram showing appearance frequency of luminance values of pixels contained within the infrared image; a background luminance level determination function which sets a luminance value corresponding to a peak value of the appearance frequency in the luminance histogram as a background luminance level which shows a luminance level of a background in the infrared image; a luminance level adjusting function which sets the background luminance level to an intermediate value of a luminance range width of the infrared image, and generates a luminance shift image in which each of other luminance values in the infrared image is shifted linearly by maintaining a contrast relation with respect to the background luminance level that is set to the intermediate value; a reversed shift image generating function which generates a reversed shift image in which the luminance level of the luminance shift image is reversed; and a luminance calculation processing function which generates the calculation processed image by performing calculation processing based on a difference in the luminance values of respective corresponding pixels of the reversed shift image and the luminance shift image.

The present invention is structured and functions as described above. According to that, the present invention includes: the module for extracting the peak luminance value (background luminance level) in the luminance histogram of the infrared image, setting the luminance value to the intermediate value of the infrared image, and generating a luminance shift image in which the other luminance values are shifted linearly based on the intermediate value; and the module for generating a calculation processed image by performing calculation processing based on the difference between the luminance levels of the luminance shift image and the reversed shift image whose luminance level is being reversed. This makes it possible to generate the image in which the target object is displayed with emphasis with respect to the background. Thereby, the present invention can provide the image target identification device, the image target identification method, and the image target identification program capable of securely identifying the target object within the infrared image.

BEST MODES FOR CARRYING OUT THE INVENTION (Exemplary Embodiment)

Next, basic structural contents of an exemplary embodiment of the invention will be described.

Figure 1:
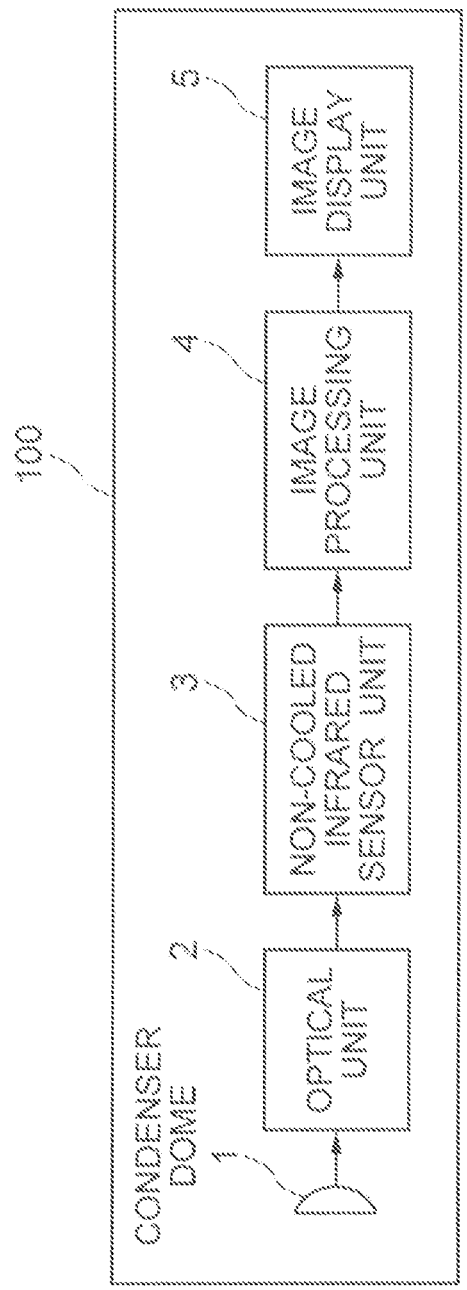
FIG. 1 is a schematic block diagram showing an exemplary embodiment of an image target identification device according to the present invention.

As shown in FIG. 1, an image identification support device (image target identification device) 100 as the exemplary embodiment includes: a far-infrared condenser dome 1 (referred to as "condenser dome" hereinafter) which collects infrared rays; an optical unit 2 which receives the collected infrared rays via a condensing lens set in advance; a non-cooled infrared image sensor unit 3 which generates a heat image (infrared image) corresponding to the temperature of a captured target based on a wavelength (band) acquired via the optical unit 2; an image processing unit 4 which performs image processing on the infrared image generated by the non-cooled infrared image sensor unit 3, and generates a processed image in which the target object such as a ship is displayed with emphasis with respect to the background regions such as the sea and the sky in the infrared image; and an image display unit 5 which outputs/displays the generated processed image.

Hereinafter, this will be described in details.

The condenser dome 1 for collecting the infrared rays includes the condensing lens for guiding the collected infrared rays into the optical unit 2. Further, the optical unit 2 is constituted by including an optical filter for detecting a desired wavelength band set in advance.

The non-cooled infrared image sensor unit (non-cooled infrared sensor unit) 3 generates an infrared image showing the heat amount corresponding to the infrared ray passed through (filtered by) the optical filter of the optical unit 2. Note here that frames as regions to be the targets of image processing contained in the generated infrared image are set, and the infrared image is processed within the image processing unit 4 by each of the frames.

Figure 2:
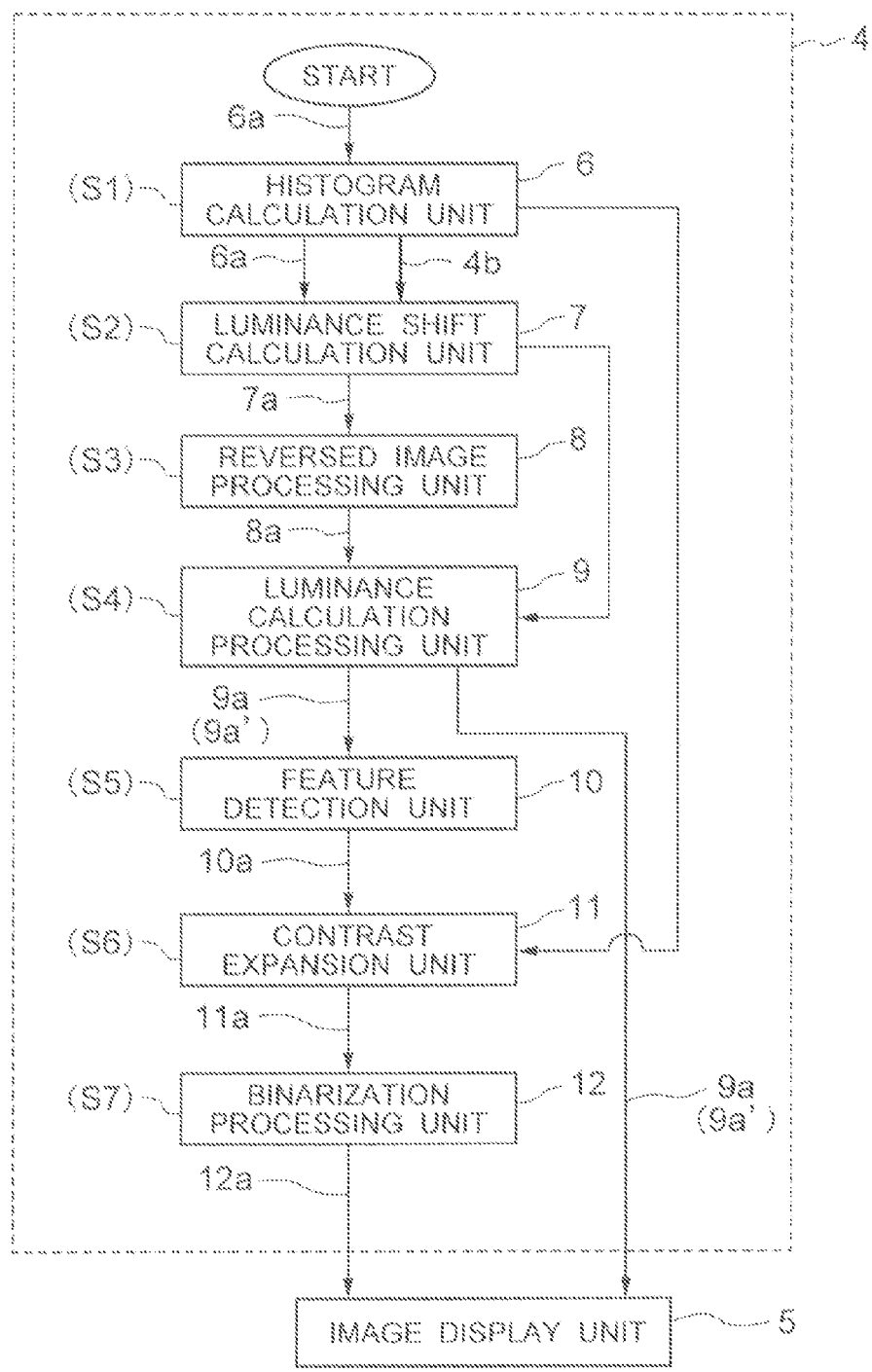
FIG. 2 is a schematic block diagram showing an example of the inside structure of an image processing unit of the image target identification device disclosed in FIG. 1.

As shown in FIG. 2, the image processing unit 4 includes: a histogram calculation unit 6 which generates luminance histograms of each frame of the infrared image, and determines the luminance levels (background luminance levels) as the background within each frame based on the luminance histograms; a luminance shift calculation unit 7 which sets the background luminance level to the intermediate value of the display gradation value (dynamic range) of the frames, and generates a luminance shift image in which the other luminance levels within the frame are converted linearly based on the intermediate value; a reversed image processing unit 8 which generates a reversed shift image in which the luminance levels are reversed based on the luminance shift image; and a luminance calculation processing unit 9 which generates an emphasis processed image in which the target object in the luminance shift image or the reversed shift image is displayed with emphasis by performing division and subtraction processing of the luminance set in advance on the luminance shift image or the reversed shift image.

Further, the image processing unit 4 is constituted with: a feature detection unit 10 which generates a filtering image by performing image filtering processing with which the target object is more emphasized with respect to the luminance information within the generated emphasis processed image; a contrast expanding unit 11 which performs processing for improving the contrast of the generated filtering image; and a binarization processing unit 12 which generates an image in which the target object is displayed with emphasis (final processed image) by performing binarization processing of equal to or more than a certain luminance level on the image in which the contrast is expanded.

The histogram calculation unit 6 includes: an original image receiving function which receives an infrared image 6a generated from the non-cooled infrared sensor unit 3; and a luminance level detecting function which detects the luminance level of each pixel contained in each frame data by taking each frame (frame data) in the infrared image 6a as a unit.

Note that the luminance level of each pixel contained in the frame data shows the temperature level that is proportional to the temperature of the heat source detected by a pixel unit by the infrared sensor provided to the non-cooled infrared sensor unit 3.

Further, the histogram calculation unit 6 includes a histogram generating function which generates a histogram (e.g., FIG. 3) which shows the appearance frequency (called "luminance frequency") of the luminance levels (luminance values) of the pixels within the frame in the dynamic range width set in advance by corresponding to each frame (frame number) of the captured image stored inside a memory of the non-cooled infrared sensor unit 3.

Further, the histogram calculation unit 6 includes a background luminance value extracting function which extracts the luminance level that takes the peak of the appearance frequency based on the histogram, and determines the extracted luminance level as a background luminance (level) that is the luminance level corresponding to the background part such as the sea or the sky, for example.

When it is detected that there are a plurality of peaks of the appearance frequency in the histogram (e.g., two points in the histogram of FIG. 3), the histogram calculation unit 6 determines a plurality of different luminance levels corresponding to those as background luminance levels, respectively.

The luminance frequency of the background luminance is set as a background luminance frequency 4b.

Further, the histogram calculation unit 6 may be set to determine the luminance level by taking the peak of the luminance frequency contained in a specific region within each frame as the background luminance level. Further, the histogram calculation unit 6 may be set to generate the histogram by corresponding to each divided region, and to determine the background luminance level based on the histogram.

Further, the histogram calculation unit 6 includes a luminance frequency transmitting function which transmits the background luminance frequency 4b as the frequency value of the extracted background luminance level and the frame data 6a to the luminance shift calculation unit 7.

Further, the histogram calculation unit 6 may be set to determine a plurality of different luminance levels of the appearance frequency of equal to or more than a specific value in the generated histogram, for example, as the background luminance value (background luminance level).

Thereby, the histogram calculation unit 6 can extract a plurality of different regions contained in the captured image where a specific luminance frequency occupies mostly as the background regions such as the sky and the sea.

Thus, the histogram calculation unit 6 can extract the background regions such as the sky region, the sea region, as well as the fair part and the cloudy part in the sky region contained in the frame, respectively, and set the corresponding background luminance, respectively.

Figure 5:
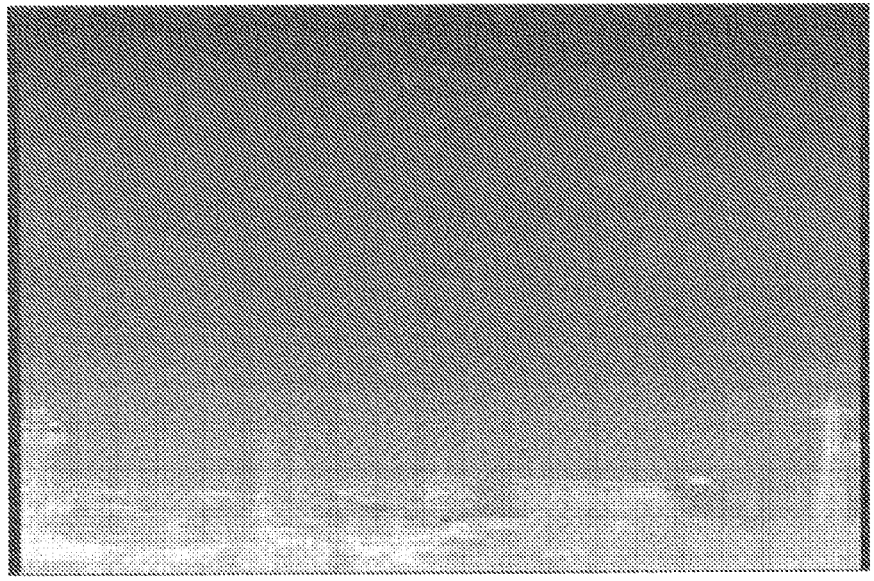
FIG. 5 is an explanatory chart showing an example of an infrared image acquired by capturing a flying object that is a target object according to the image identification device disclosed in FIG. 1.

For example, as shown in FIG. 5, when an inputted infrared image is the frame data 6a which contains different backgrounds containing a cloudy part as well as a fair part and a flying object as a target object, the histogram calculation unit 6 extracts the luminance level showing the peak of the appearance frequency based on the histogram of the frame data 6a as the background luminance level.

In this case, two luminance levels showing the fair part and the cloudy part are extracted as the background luminance levels, and those are transmitted to the luminance shift calculation unit 7 along with the frame data 6a.

Thereby, the luminance shift calculation unit 7 can generate an image in which the luminance difference between the cloudy part as the background and the flying object as the target object is expanded effectively, and generate an image in which the luminance difference between the fair part and the flying object as the target object is expanded effectively also in the fair part as the background.

Figure 4:
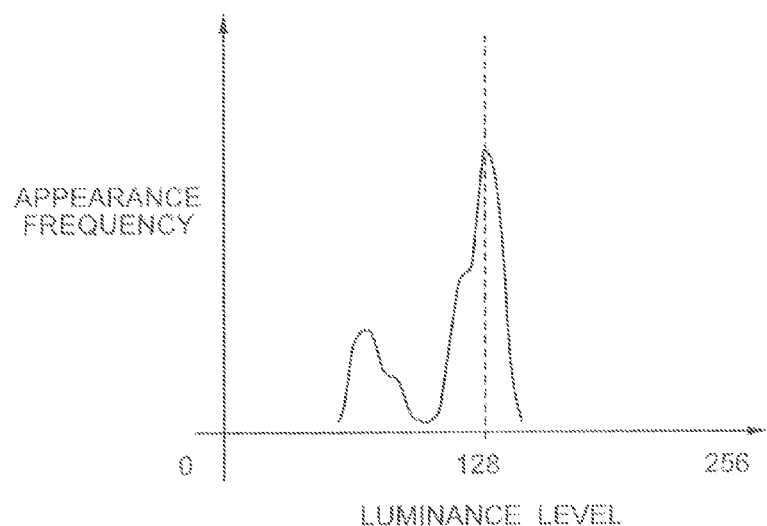
FIG. 4 shows a luminance histogram of a luminance shift image in which luminance of each pixel of the infrared image is shifted linearly according to the image target device disclosed in FIG. 1.

The luminance shift calculation unit (luminance level adjusting unit) 7 includes a luminance shift image generating function which generates a luminance shift image by performing processing for setting the luminance level (background luminance level) of the background luminance frequency 4b sent in from the histogram calculation unit 6 to the intermediate value of the luminance range width of the frame data 6a as shown in FIG. 4 and for shifting the luminance levels of other pixels within the frame data 6a linearly based on the intermediate value, i.e., shifting the luminance levels of the other pixel within the frame data 6a to a state where the contrast relation with respect to the background luminance level set as the intermediate value (luminance level) is maintained.

Thereby, the luminance shift calculation unit 7 can generate an image (luminance shift image) in which the contrast of the luminance levels of the target object (extraction target) such as a floating object, a ship floating on the sea surface, a flying object in an airspace, an obstacle in a low airspace, or the like, for example, within a captured image and the background part such as the sea and the air region within the captured image is emphasized so that the visibility of the target can be improved effectively.

Further, the luminance calculation unit 7 can generate a plurality of different luminance shift images which correspond to each background luminance level set to the intermediate value by setting the background luminance levels set for each different background such as the sea, sky, or a fair sky region, a cloudy sky region by the luminance shift image generating function to the intermediate value of the luminance range width of the frame data 6a, respectively.

Thereby, for example, the target that is not effectively displayed with emphasis in the luminance shift image generated based on the sea background luminance level can be displayed with emphasis within the luminance shift image generated based on the sky background luminance level.

Further, this makes it possible to generate a luminance shift image in which each of the targets is displayed with emphasis with a fine visibility for the set different background luminance levels by generating the luminance shift image based on the background luminance level corresponding to each of the different targets contained within the frame.

Figure 3:
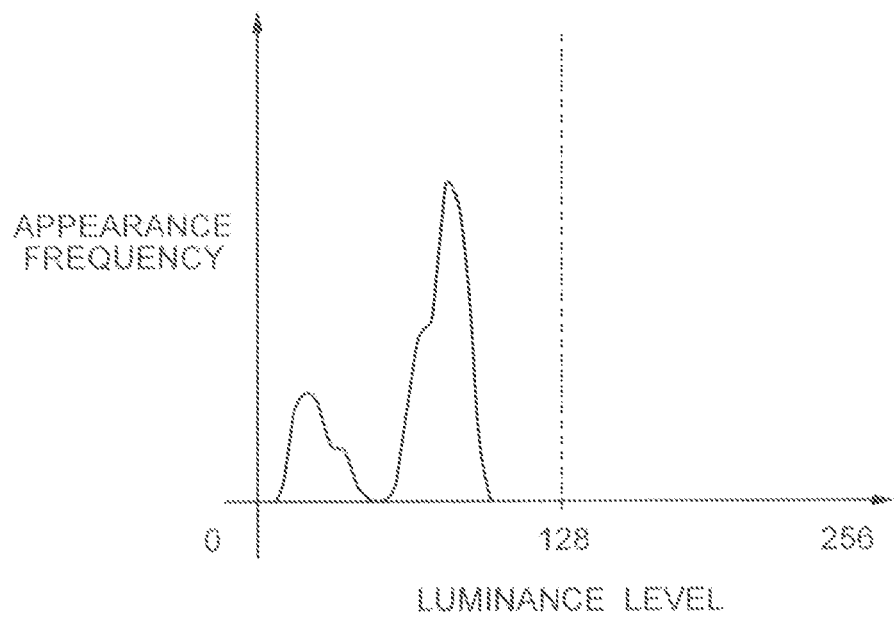
FIG. 3 is an explanatory chart showing the luminance histogram of 1-frame data of an infrared image of the image target identification device disclosed in FIG. 1.

Specifically, when most of the background region in an inputted infrared sensor image (infrared image) is the sea that has the luminance level of 256, for example, the luminance calculation unit 7 sets the mode of the background luminance level (means the sea in this case) is set to 128 that is the intermediate value as shown in FIG. 4 based on the histogram of the frame data 6a (FIG. 3). Since the background region contained in the inputted infrared image is mostly the sea, the luminance shift calculation unit 7 sets the luminance level showing the mode in the histogram of FIG. 4 to the intermediate value (128) as the background luminance level.

Here, the luminance calculation unit 7 generates a luminance shift image 7a by performing processing (shift processing) which converts (shifts) the other luminance levels linearly within the frame by taking the intermediate value as the reference, i.e., shifts the luminance levels of the other pixels based on the intermediate value (128) so that the contrast relation between the background luminance level and the other luminance levels can be maintained.

It is to be noted that the luminance value that exceeds the maximum luminance 255 is set to be 255 and the luminance value that is equal to or less than the minimum luminance value 0 is set to be 0, respectively, due to the execution of the shift processing.

Now, described is a case where the background luminance levels sent in from the histogram calculation unit 6 are two luminance levels showing the fair part and the cloudy part, respectively, for example.

Figure 6:
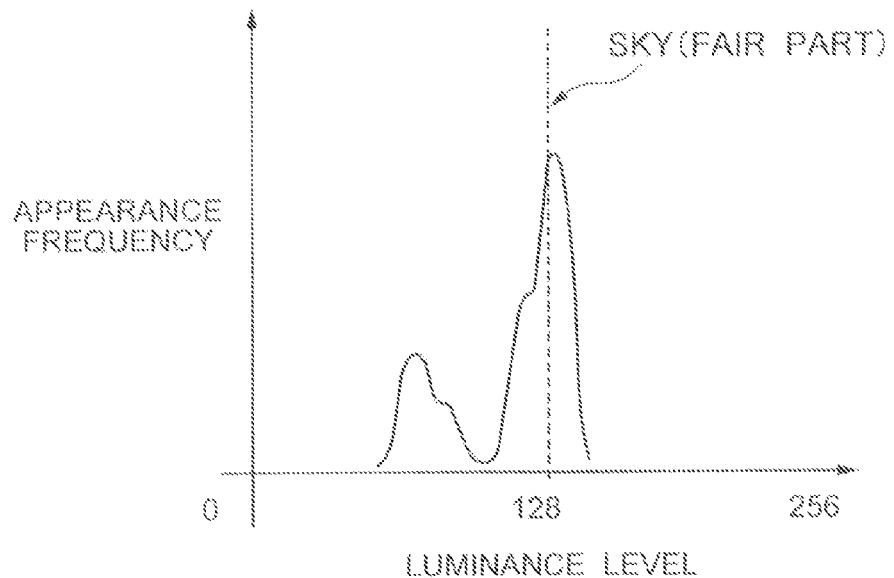
FIG. 6 shows a luminance histogram of a luminance shift image in which luminance of each pixel of the infrared image is shifted linearly based on the luminance showing the sky of a fair part of the infrared image disclosed in FIG. 5.

In this case, the luminance calculation unit 7 sets the background luminance level showing the sky (fair part) set as the background of the frame to 128 as the intermediate value as shown in FIG. 6 based on the histogram of the frame data 6a, and performs the shift processing of the other luminance levels based on the intermediate value.

Figure 8:
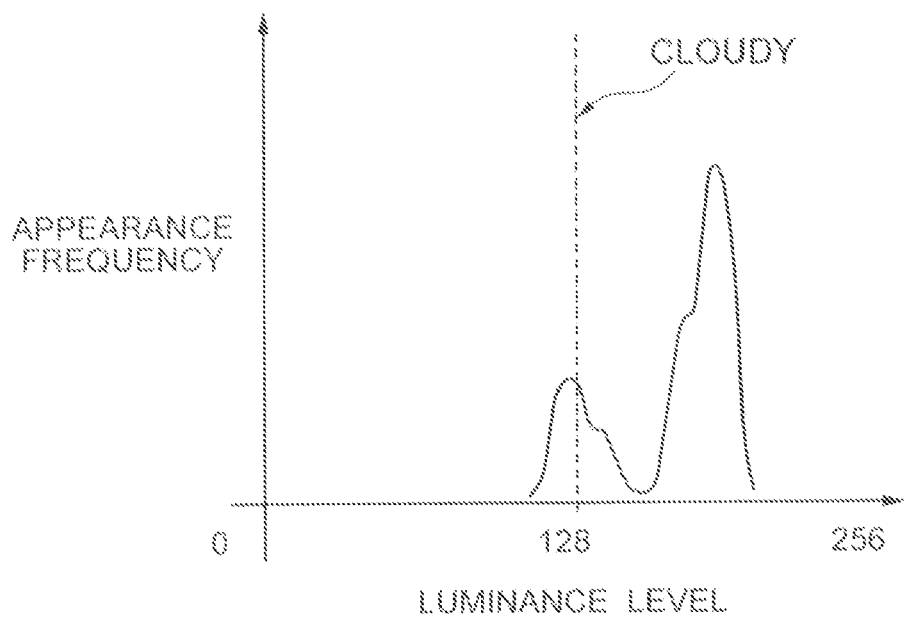
FIG. 8 shows a luminance histogram of a luminance shift image in which luminance of each pixel of the infrared image is shifted linearly based on the luminance showing the sky of a cloudy part of the infrared image disclosed in FIG. 5.

Further, the luminance level calculation unit 7 sets the background luminance level showing the clouds as the background of the frame to 128 as the intermediate value as shown in FIG. 8 based on the histogram of the frame data 6a, and performs the shift processing of the other luminance levels based on the intermediate value.

Thereby, the luminance calculation unit 7 acquires a luminance shift image generated by performing the shift processing based on the background showing the fair part and a luminance shift image generated by performing the shift processing based on the background showing the cloudy part (clouds).

Further, the luminance shift calculation unit 7 stores the luminance shift images 7a generated based on the different background luminance levels to the storage unit.

Furthermore, the luminance calculation unit 7 includes a luminance shift image transferring function which duplicates each of the stored luminance shift image 7a, and transmits the luminance shift images 7a to the reversed image processing unit 8 and the luminance calculation processing unit 9, respectively.

The reversed image processing unit 8 includes a reversed image generating function which saves the luminance shift images 7a sent in from the luminance shift calculation unit 7 to the memory, and generates reversed shift images in which the gradations of the luminance levels of the luminance shift images are reversed (e.g., black-to-white reversion).

When a plurality of different luminance shift images 7a generated based on the different background luminance levels, respectively, are sent in, the reversed image processing unit 8 generates the reversed shift images corresponding to the respective luminance shift images 7a, and transmits the reversed shift images to the luminance calculation processing unit 9.

The luminance calculation processing unit 9 includes an emphasis processed image generating function which generates an emphasis processed image in which the target objet within the image is displayed with emphasis based on the luminance shift images 7a sent in from the luminance shift calculation unit 7 and the reversed shift images 8a sent in from the reversed image processing unit 8. The emphasis processed image is constituted with luminance values P (x, y) of the position addresses (pixels: (x, y)).

Specifically, the luminance calculation processing unit 9 calculates the average values of the luminance values (luminance average value) of each of the position addresses (pixels: (x, y)) of the luminance shift images 7a and the reversed shift images 8a, and defines the luminance value of each pixel in the image having the larger average value as P(x, y).

Note here that the luminance calculation processing unit 9 may also take the luminance value of each pixel in the luminance shift images 7a as P(x, y), and take the luminance value of each pixel of the reversed shift images 8a as [Lmax−P(x, y)], for example.

Note here that the luminance calculation processing unit 9 includes a function which performs processing for dividing the luminance value P(x, y) of each pixel of one of the images of the luminance shift images 7a and the reversed shift images 8a by the luminance value [Lmax−P(x, y)] of each pixel of the other image.

Note here that the luminance range width (display gradation value) of the luminance shift image 7a and the reversed shift image 8a is defined as Lmax.

It is assumed here that the luminance calculation processing unit 9 generates an image in which the luminance difference of the target with respect to the background is expanded (division processed image in this case) by performing a calculation based on Expression 1 shown below for the luminance shift images 7a and the reversed shift images 8a (a division emphasis processed image generating function).

When performing the calculation processing (division processing), the luminance calculation processing unit 9 multiplies Lmax to the calculation result so that the intermediate value levels as the calculation results in each of the position addresses become equivalent. This makes it possible to expand the dynamic range of the image generated by the above-described processing, so that the luminance difference between the target object and the background can be expanded effectively.

$$R(x,y)=\{P(x,y)/(Lmax-P(x,y))\}\times Lmax \quad \text{[Expression 1]}$$

Further, the luminance calculation processing unit 9 includes a function which sends out a division processed image 9a generated by performing the above-described calculation processing (the division emphasized image generating function) to the feature detection unit 10.

Figure 9:
FIG. 9 is an explanatory chart showing an example of an image acquired by performing division processing based on the luminance shift image of FIG. 6 and its reversed image by the image identification device disclosed in FIG. 1.

Note here that FIG. 9 shows the division processed image (9a) generated by executing the division emphasized image processing function on the luminance shift image 7a based on the background luminance level (intermediate luminance level shown in FIG. 8) showing the cloudy part (cloud). In FIG. 9, the luminance difference (contrast) of the flying object with respect to the cloudy part as the background is expanded effectively.

Further, the luminance calculation processing unit 9 includes a subtraction emphasized image generating function which contains processing for subtracting (Lmax−P(x, y)) from P(x, y) as shown in following Expression 2 and generates an image (a subtraction processed image in this case) in which the luminance difference of the target object with respect to the background is expanded.

When performing the above-described subtraction, the luminance calculation processing unit 9 adds Lmax/2 to the calculation results so that the intermediate value levels of each of the position addresses become equivalent. This makes it possible to extend the dynamic range of the image generated by the above-described processing, and to expand the luminance difference between the target object and the background effectively.

$$R(x,y)=P(x,y)-(Lmax-P(x,y))+Lmax/2 \quad \text{[Expression 2]}$$

The luminance calculation processing unit 9 includes a function which sends out a subtraction processed image 9a' generated by performing the above-described calculation processing (a subtraction emphasized image generating function) to the feature detection unit 10.

Figure 7:
FIG. 7 is an explanatory chart showing an example of an image acquired by performing subtraction processing based on the luminance shift image of FIG. 6 and its reversed image by the image identification device disclosed in FIG. 1.

FIG. 7 shows the subtraction processed image (9a') generated by performing the above-described subtraction processing on the luminance shift image 7a based on the background luminance level (the intermediate luminance level shown in FIG. 6) showing the fair part.

Here, it is shown that the luminance difference of the flying object with respect to the sky (fair part) as the background is expanded effectively.

The luminance calculation processing unit 9 may be set to execute the division emphasized image generating function and the subtraction emphasized image generating function in parallel, and transmit the processed image whose luminance difference of the target object with respect to the background is greater out of the division processed image 9a and the subtraction processed image 9a' to the feature detection unit 10.

The feature detection unit 10 includes a filtering processing function which generates a filtering image 10a by performing filtering processing for eliminating a luminance region (pixel) that is less than the luminance frequency set in advance from the image on the division processed image 9a (subtraction processed image 9a') sent from the luminance calculation processing unit 9.

This makes it possible to relatively increase the appearance frequency of the luminance value having the appearance frequency value in the image (the filtering image 10a) that is higher than a specific value.

The contrast expansion unit 11 generates a contrast extended image 11a by selecting a region (referred to as "luminance region") having a value equal to or higher than the luminance value set in advance of the filtering image 10a, setting the luminance level as the mode of the luminance region to the intermediate value of the display gradation value, and performing linear conversion on the selected other luminance value based on the intermediate value (a contrast expansion processing function).

In the contrast extended image 11a, the vicinity of the selected luminance value becomes the most frequent luminance level, and the contrast between the target object and the background is expanded further.

Figure 10:
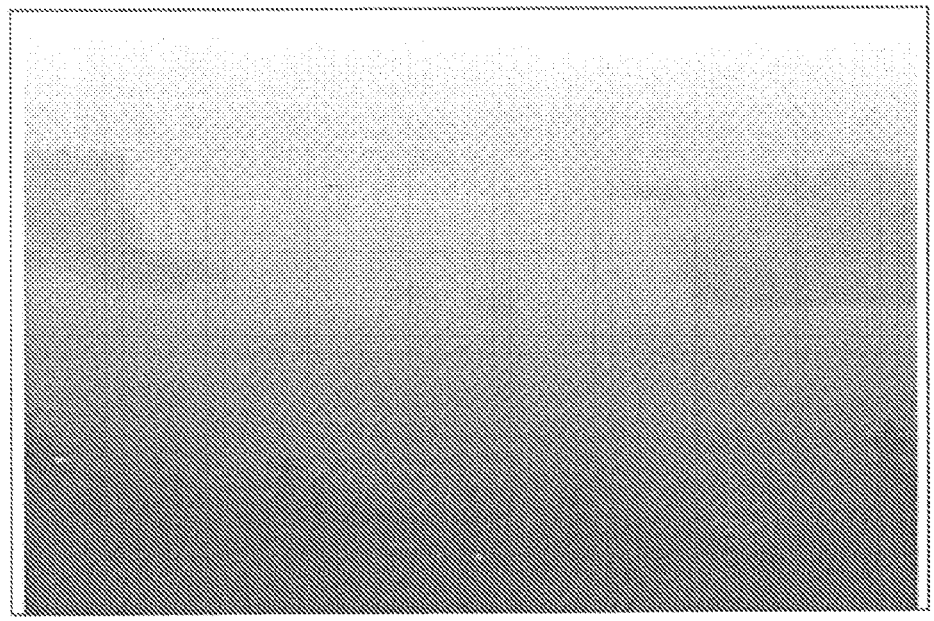
FIG. 10 is an explanatory chart showing a final processed image acquired by performing processing for expanding the contrast between a target object and the background region in an infrared image by the image identification device disclosed in FIG. 1.

Note here that the contrast extended image (the final processed image) 11a generated by the contrast expansion processing function is shown in FIG. 10. The contrast expansion processing can suppress the luminance variation different for each background luminance value set as the mode. Thus, the luminance difference of the target object with respect to the respective different backgrounds can be expanded further.

The binarization processing unit 12 includes a binarization processing function which generates a binary image 12a by performing threshold-value processing on the luminance of each pixel of the contrast extended image 11a.

Further, the binary image processing unit 12 may be set to extract the target object from the binary image 12a outputted to the image display unit 5 and to perform image emphasized display of the target object.

As a method of the image emphasized display, the binarization processing unit 12 may be set to provide display by superimposing a mark image on the extracted target object within the binary image 12a, for example.

As described above, in this exemplary embodiment, the luminance level of the background (the background luminance level) determined based on the luminance distribution within each frame of an infrared image (original image) inputted from the non-cooled infrared sensor unit 3 is aligned with the intermediate value of the dynamic range of the luminance of the infrared image, and the luminance shift image (7a) and the reversed shift image (8a) thereof are generated based on the intermediate value.

In the luminance shift image and the reversed shift image, the luminance difference as the luminance value of the target object with respect to the luminance values of the different background regions such as the sea, sky, fair part, cloudy part, and the like is expanded.

Furthermore, with this exemplary embodiment, the luminance difference of the target object with respect to the background region can be expanded further by performing the calculation processing on the luminance values of the corresponding pixels in the luminance shift image and the reversed shift image.

Further, the image identification support device 100 can generate an image in which the target is displayed with emphasis by improving the contrast of the backgrounds (different background regions such as the sea, sky, the fair part, the cloudy part, and the like) of the target object in the infrared image captured by the non-cooled infrared sensor unit 3, so that it is possible to easily identify the target object within the infrared image.

Therefore, it is possible with the image identification support device 100 to eliminate the background noise such as the white-crested wave in the infrared image, so that the contrast and the visibility of the target object can be improved effectively.

Thereby, it can be utilized effectively for discovering a floating object between the waves such as a person, a rescue boat, and the like as well as a flying object in the infrared image when performing a rescue operation at the sea, for example.

(Explanations Regarding Actions of Exemplary Embodiment)

Next, outline of the actions of the exemplary embodiment will be described.

First, the luminance histogram calculation unit 6 of the image processing unit 4 generates a luminance histogram showing the appearance frequency of the luminance values of the pixels contained in the infrared image (a luminance histogram calculation step), and determines the background luminance level showing the background in the infrared image based on the luminance histogram (a background luminance level determining step).

Then, the luminance calculation unit 7 generates a luminance shift image by setting the determined background luminance level to the intermediate value of the luminance range width of the infrared image and linearly shifting each of the other luminance values in the infrared image to the luminance values with which the contrast relation with respect to the background luminance level can be maintained based on the intermediate value (a luminance level adjusting step).

Then, the reversed image processing unit 8 generates a reversed shift image in which the luminance level of the luminance shift image is reversed (a reversed shift image generating step). The luminance calculation processing unit 9 generates the calculation processed image by performing a calculation based on the difference between the luminance values at the respective corresponding positions of the luminance shift image and the reversed shift image (a luminance calculation processing step), and the image target extraction unit 13 extracts the target object from the calculation processed image.

Note here that the execution contents of the luminance histogram calculation step, the background luminance level determining step, the luminance level adjusting step, the reversed shift image generating step, and the luminance calculation processing step may be put into a program to have it executed by a computer.

Next, a processing action done by the image processing unit 4 of the image identification support device 100 for extracting the target object will be described by referring to FIG. 2.

First, the image processing unit 4 receives the infrared image 6a that has been put into an image from the non-cooled infrared image sensor unit 3, and the luminance histogram calculation unit (histogram calculation unit) 6 detects the luminance levels of each pixel contained in each frame by having each of the frames (frame data) of the infrared image 6a as a unit.

It is to be noted that the luminance level imaged by the non-cooled infrared sensor unit 3 shows the signal level that is proportional to the temperature of the heat source detected by the infrared sensor provided to the non-cooled infrared sensor unit 3 by a pixel unit.

Then, the histogram calculation unit 6 generates a histogram showing the relation between the luminance levels and the appearance frequency in each frame by corresponding to the frame number of each inputted frame.

Further, the histogram calculation unit 6 extracts the luminance level that takes the peak of the appearance frequency in the histogram of each frame as the background luminance level 4b, and transfers the background luminance levels and each frame data 6a to the luminance shift calculation unit 7 (step S1).

Then, the luminance shift calculation unit 7 sets the background luminance level corresponding to each frame data 6a sent in from the histogram calculation unit 6 as the intermediate value of the luminance display gradation value (dynamic range) of each frame data 6a, and performs processing (shift processing) for linearly shifting the other luminance levels with which the contrast relation with respect to the background luminance level set as the intermediate value can be maintained.

When a plurality of different background luminance levels are set for each frame data 6a, each background luminance level is set as the intermediate value of the luminance display gradation value in each frame data 6a, and shift processing based on that intermediate value is to be performed.

When the luminance level of an infrared sensor image is of 256 gradations, for example, the luminance shift calculation unit 7 sets the background luminance level in the histogram (FIG. 3) of the frame data 6a to 128 as the intermediate value (FIG. 4) as shown in FIG. 5, and linearly shifts (converts) the other luminance levels within the frame by having it as the reference to generate the luminance shift image 7a.

Here, it is assumed that the background luminance level is set to the mode.

The luminance levels exceeding the maximum luminance 255 are considered as 255, and the luminance levels equal to or less than the minimum luminance 0 are considered as 0 for calculation.

Further, the luminance shift calculation unit 7 duplicates the generated luminance shift image 7a, stores it to the luminance shift image storage unit set in advance within the image processing unit 4, and transmits it to the reversed image processing unit 8 and the luminance calculation processing unit 9, respectively (step S2).

Then, the reversed image processing unit 8 generates the reversed shift image 8a in which the luminance levels of the luminance shift image 7a are reversed (black-to-white reversion, for example), and sends it to the luminance calculation processing unit 9 (step S3).

Then, the luminance calculation processing unit 9 receives the reversed shift image 8a sent from the reversed image processing unit 8, calculates each of the in-frame luminance average values of the luminance shift image 7a and the reversed shift image 8a stored in the luminance shift image storage unit, respectively, and defines the luminance value in the image whose luminance average value is larger out of the both images (the luminance shift image 7a and the reversed shift image 8a) as P(x, y) and the luminance value in the other image as {Lmax−P(x, y)}. Note that (x, y) shows the position address of the pixel within each image.

Here, the luminance calculation processing unit 9 performs processing for dividing the luminance value of one of the images by the luminance value of the other image regarding the luminance values of the positions addresses corresponding to the luminance shift image 7a and the reversed shift image 8a, respectively, based on following Expression 1 (division processing). When performing the division processing, the luminance calculation processing unit 9 multiplies Lmax as the luminance dynamic range width of the luminance shift image 7a and the reversed shift image 8a to the calculation result as shown in Expression 1 so that the result can become equal to the intermediate value level of the calculation result.

$$R(x,y)=\{P(x,y)/(Lmax-P(x,y))\} \times Lmax \quad \text{[Expression 1]}$$

Thereby, the luminance calculation processing unit 9 generates the divided image I (9a) constituted with R(x, y) in which the luminance difference between the target object and the background in the image is effectively emphasized, and sends out the divided image 9a to the feature detection unit 10 (step S4).

Further, the luminance calculation processing unit 9 performs processing for subtracting the luminance value of the other image from the luminance value of one of the images regarding the luminance values of the positions addresses corresponding to the luminance shift image 7a and the reversed shift image 8a, respectively, based on following Expression 2 (subtraction processing).

In the subtraction processing, Lmax/2 is added to the calculation results so that the calculation results of each of the position addresses become equivalent.

$$R(x,y)=P(x,y)-(Lmax-P(x,y))+Lmax/2 \quad \text{[Expression 2]}$$

Thereby, the luminance calculation processing unit 9 generates a subtraction image II (9a') constituted with R(x, y) in which the contrast of the target object with respect to the background luminance is emphasized, and sends out the subtraction image 9a' to the feature detection unit 10 (step S4).

It is desirable to employ the calculation with which the luminance difference of the target object with respect to the background becomes larger, regarding whether the division processing or the subtraction processing is to be performed on the different luminance shift images 7a and the reversed shift images 8a corresponding thereto. However, it is also possible to make selection by comparing the processed images (the division image and the subtraction image) acquired as the final results.

Then, the luminance calculation processing unit 9 inputs the generated division processed image 9a and the subtraction processed image 9a' to the feature detection unit 10.

Note here that the luminance calculation processing unit 9 may be set to send the generated division processed image 9a and the subtraction processed image 9a' to the image display unit 5 as a through image when there is a luminance difference of more than a specific amount between the background image and the target object.

In that case, the division processed image 9a and the subtraction processed image 9a' are displayed on the image display unit 5 as the calculation processed image.

Next, the simulation processing result of the division processing performed by the luminance calculation processing unit 9 by using the luminance shift image 7a (original image A) and the reversed shift image 8a (reversed image B) as the input images will be described by referring to FIG. 11. Note here that "y=x" in FIG. 11 shows the luminance level of the original image A, and "y=255−x" shows the luminance level of the reversed image of the original image A.

Figure 11:
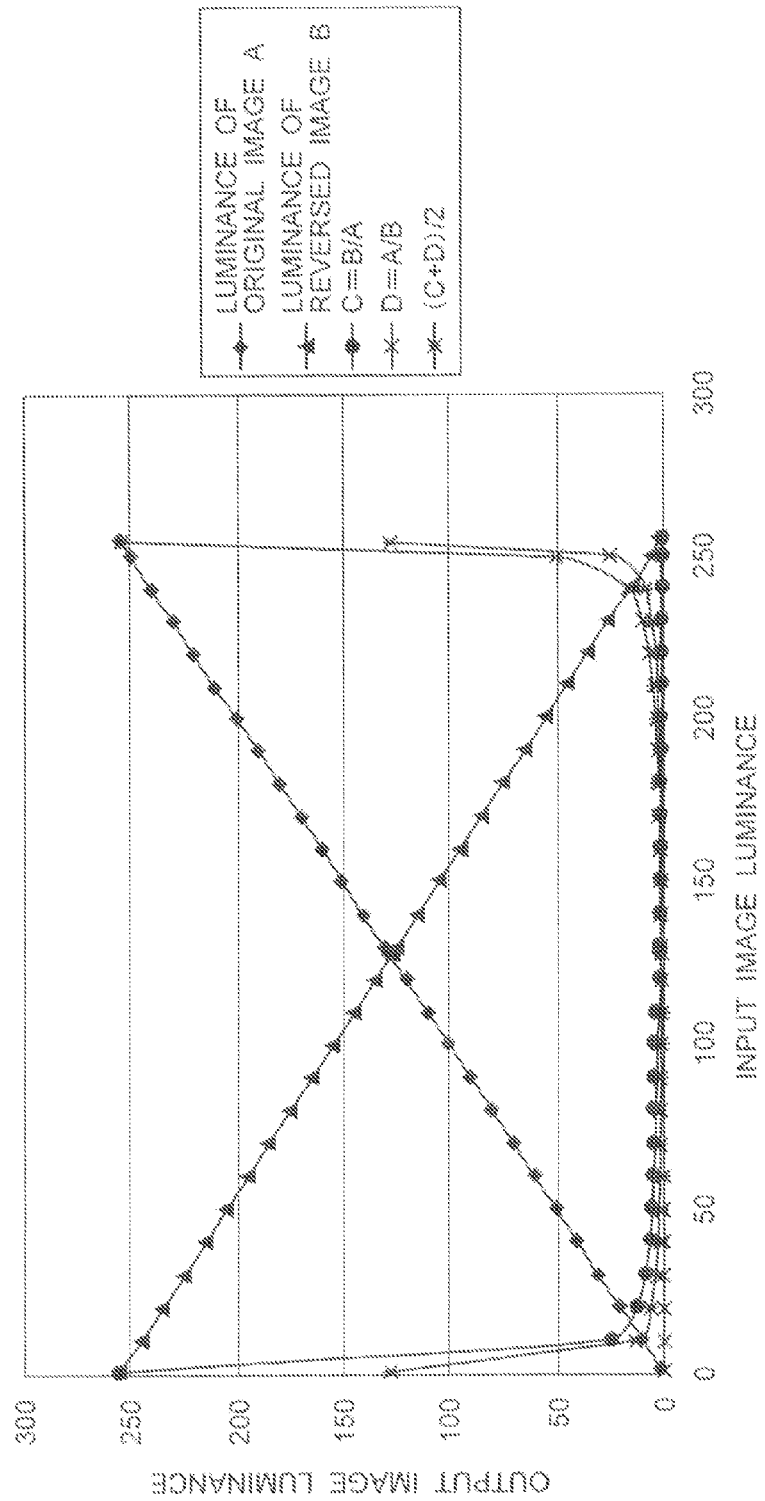
FIG. 11 is an explanatory chart showing the result acquired by performing simulation of division processing of luminance values based on a luminance shift image (original image) and its reversed image by the image target identification device disclosed in FIG. 1.

For example, when the processing for dividing the original image A by the reversed image B (A/B) or the processing for dividing the reversed image B by the original image A (B/A), the expansion width between the luminance in a part in the vicinity of 0 to 30 gradations with respect to the x-axis where the luminance of the input image is low (a dark part) and the luminance in a part in the vicinity of 210 to 255 gradations where the luminance of the input image is high (a bright part) becomes large as shown in FIG. 11.

There are some cases where the luminance expansion level becomes abnormally high and becomes saturated as the calculation results, so that the luminance calculation processing unit 9 may be set to select the average of the calculation results ((C+D)/2) or select the value larger or smaller than 128 that is the intermediate value to set it as the luminance value of the output image.

Thereby, the luminance calculation processing unit 9 calculates the value in the vicinity of 150 as the luminance levels, so that the image in which the contrast of the target object with respect to the background is expanded effectively can be generated.

Then, the feature detection unit 10 generates the filtering image 10a by performing the filtering processing on the division processed image 9a (or the subtraction processed image 9a') sent in from the luminance calculation processing unit 9 in step S4 for eliminating the luminance region (pixels) less than the luminance frequency set in advance in the image, and transmits it to the contrast expansion unit 11 (step S5).

Thereby, the luminance in the vicinity of the mode in the image (the filtering image 10a) is increased relatively.

The contrast expansion unit 11 selects the region (called as "luminance region) of equal to or more than the luminance value set in advance in the inputted filtering image 10a, generates a contrast extended image 11a in which the contrast is expanded by linearly extending the luminance range of the luminance region so that the vicinity of the mode becomes the maximum based on the mode of the selected luminance, and sends it out to the binarization processing unit 12 (step S6).

Then, the binarization processing unit 12 generates a binary image 12a by performing threshold value processing set in advance on the luminance of each pixel of the contrast extended image 11a (binary processing), and outputs the binary image 12a to the image display unit 5 (step S7).

Further, the binarization processing unit 12 may also be set to extract the target object from the binary image 12a outputted to the image display unit 5, and display the target object with emphasis.

Note here that the binarization processing unit 12 superimposes a mark set by corresponding to the extracted target object on the target object within the binary image 12a to display, for example, as a method for the emphasized display.

As described above, with the image identification support device 100 as the exemplary embodiment, luminance displacement of the background regions occupying most of the image luminance distribution as the image processing target can be suppressed, and the luminance difference of the target object with respect to the luminance of the background regions can be expanded.

Further, it is possible to eliminate small noise with extremely small luminance difference within the image by performing the division (subtraction) processing on the luminance shift image and the reversed shift image. Furthermore, an effect of expanding the luminance difference can be achieved.

Therefore, it is possible to perform prompt and effective image processing without requiring an expensive and complicated optical system and also without executing processing of high calculation load such as histogram quantization and individual noise elimination processing. Further, it is possible to extract the target object whose temperature difference with respect to the background is small and contrast with respect to the background is difficult to be secured.

Furthermore, extraction of a floating object between the waves contained in the infrared image and dissipation of white-crested waves can be done effectively.

The new technical contents of the above-described exemplary embodiment can be summarized as follows.

While a part of or a whole part of the exemplary embodiment can be summarized as follows as the new technique, the present invention is not necessarily limited only to the followings.

(Supplementary Note 1)

An image target identification device which includes: an optical unit which collects infrared rays from a filming target containing a target object and acquires a specific wavelength band from the collected infrared rays; a non-cooled infrared image sensor which generates an infrared image corresponding to a temperature of the filming target based on the wavelength acquired by the optical unit; and an image processing unit which generates a calculation processed image in which the target object is displayed with emphasis based on the infrared image, wherein the image processing unit includes: a luminance histogram calculation unit which generates a luminance histogram showing appearance frequency of luminance values of pixels contained within the infrared image; a background luminance level setting unit which sets a luminance value corresponding to a peak value of the appearance frequency in the luminance histogram as a background luminance level which shows a luminance level of a background in the infrared image; a luminance level adjusting unit which sets the background luminance level to an intermediate value of a luminance range width of the infrared image, and generates a luminance shift image in which each of other luminance values in the infrared image is shifted linearly by maintaining a contrast relation with respect to the background luminance level that is set to the intermediate value; and a luminance calculation processing unit which generates a reversed shift image in which the luminance level of the luminance shift image is reversed, and generates the calculation processed image by performing calculation processing based on a difference in the luminance values of respective corresponding pixels of the reversed shift image and the luminance shift image.

(Supplementary Note 2)

The image target identification device depicted in Supplementary Note 1, wherein the luminance level adjusting unit includes a plural luminance shift image generating function which, when a plurality of different background luminance levels based on the luminance histogram are set, generates luminance shift images corresponding to each of the set background luminance levels.

(Supplementary Note 3)

The image target identification device depicted in Supplementary Note 1 or 2, wherein the luminance calculation processing unit includes a subtraction processing module which generates the calculation processed image by performing subtraction processing which subtracts a frequency value of each pixel in one image out of the luminance shift image and the reversed shift image from a frequency value of a corresponding pixel in the other image.

(Supplementary Note 4)

The image target identification device depicted in Supplementary Note 1 or 2, wherein the luminance calculation processing unit includes a division processing module which generates the calculation processed image by performing division processing which divides a frequency value of each pixel in one image out of the luminance shift image and the reversed shift image by a frequency value of a corresponding pixel in the other image.

(Supplementary Note 5)

The image target identification device depicted in Supplementary Note 1 or 2, wherein the luminance calculation processing unit includes: a subtraction processing module which generates the calculation processed image by performing subtraction processing which subtracts a frequency value of each pixel in one image out of the luminance shift image and the reversed shift image from a frequency value of a corresponding pixel in the other image; and a division processing module which generates the calculation processed image by performing division processing which divides a frequency value of each pixel in one image out of the luminance shift image and the reversed shift image by a frequency value of a corresponding pixel in the other image.

(Supplementary Note 6)

The image target identification device depicted in in any one of Supplementary Notes 1 to 5, which includes: a filtering processing unit which generates a filtering image by eliminating the luminance of the pixel in a luminance region less than the luminance frequency set in advance in the calculation processed image; a contrast expansion unit which performs expansion processing of a contrast of the filtering image based on the luminance values contained in the filtering image; and a binarization processing unit which performs processing for binarizing the pixels of the luminance levels of equal to or more than a specific value in the calculation processed image.

(Supplementary Note 7)

An image target identification method which collects infrared rays from a filming target containing a target object and generates a calculation processed image in which the target object is displayed with emphasis based on an infrared image generated from the collected infrared rays based on a temperature of the captured object, and the method includes: generating a luminance histogram showing appearance frequency of luminance values of pixels contained within the infrared image; setting a luminance value corresponding to a peak value of the appearance frequency in the luminance histogram as a background luminance level which shows a luminance level of a background in the infrared image; setting the background luminance level to an intermediate value of a luminance range width of the infrared image, and generating a luminance shift image in which each of other luminance values in the infrared image is shifted linearly by maintaining a contrast relation with respect to the background luminance level that is set to the intermediate value; generating a reversed shift image in which the luminance levels of the luminance shift image is reversed; and generating the calculation processed image by performing calculation processing based on a difference in the luminance values of respective corresponding pixels of the reversed shift image and the luminance shift image.

(Supplementary Note 8)

An image target identification program for collecting infrared rays from a filming target containing a target object and generating a calculation processed image in which the target object is displayed with emphasis based on an infrared image generated from the collected infrared rays based on a temperature of the captured object, and the program is characterized to cause a computer to execute: a luminance histogram calculation function which generates a luminance histogram showing appearance frequency of luminance values of pixels contained within the infrared image; a background luminance level determination function which sets a luminance value corresponding to a peak value of the appearance frequency in the luminance histogram as a background luminance level which shows a luminance level of a background in the infrared image; a luminance level adjusting function which sets the background luminance level to an intermediate value of a luminance range width of the infrared image, and generates a luminance shift image in which each of other luminance values in the infrared image is shifted linearly by maintaining a contrast relation with respect to the background luminance level that is set to the intermediate value; a reversed shift image generating function which generates a reversed shift image in which the luminance level of the luminance shift image is reversed; and a luminance calculation processing function which generates the calculation processed image by performing calculation processing based on a difference in the luminance values of respective corresponding pixels of the reversed shift image and the luminance shift image.

While the present invention has been described heretofore by referring to the embodiment (and EXAMPLE), the present invention is not limited only to the embodiment (and EXAMPLE). Various changes and modifications occurred to those skilled in the art can be applied to the structures and details of the present invention without departing from the scope of the present invention.

This application claims the Priority right based on Japanese Patent Application No. 2009-254350 filed on Nov. 5, 2009 and the disclosure thereof is hereby incorporated by reference in its entirety.

Industrial Applicability

The present invention can be effectively employed to an infrared image processing system which automatically detects the target contained in an infrared image by performing image processing which effectively increases the contrast between the target such as a ship or a flying object in the infrared image and the sky background and the sea surface background constituted with a fair part and a cloudy part.

Reference Numerals

1 Condenser dome
  2 Optical unit
  3 Non-cooled infrared ray sensor unit
  4 Image processing unit
  5 Image display unit
  6 Histogram calculation unit
  7 Luminance shift calculation unit
  8 Reversed image processing unit
  9 Luminance calculation processing unit
  10 Feature detection unit
  11 Contrast expansion unit
  12 Binarization processing unit

The invention claimed is:

1. An image target identification device, comprising: an optical unit which collects infrared rays from a filming target containing a target object and acquires a specific wavelength band from the collected infrared rays; a non-cooled infrared image sensor which generates an infrared image corresponding to a temperature of the filming target based on the wavelength acquired by the optical unit; and an image processing unit which generates a calculation processed image in which the target object is displayed with emphasis based on the infrared image, wherein the image processing unit comprises:
a luminance histogram calculation unit which generates a luminance histogram showing appearance frequency of luminance values of pixels contained within the infrared image;
a background luminance level setting unit which sets a luminance value corresponding to a peak value of the appearance frequency in the luminance histogram as a background luminance level which shows a luminance level of a background in the infrared image;
a luminance level adjusting unit which sets the background luminance level to an intermediate value of a luminance range width of the infrared image, and generates a luminance shift image in which the luminance value of the target object in the infrared image is shifted linearly by maintaining a contrast relation with respect to the background luminance level that is set to the intermediate value; and
a luminance calculation processing unit which generates a reversed shift image in which the luminance level of the luminance shift image is reversed, and generates the calculation processed image by performing calculation processing for expanding the luminance difference between the target object and the background based on the reversed shift image and the luminance shift image.

2. The image target identification device as claimed in claim 1, wherein the luminance level adjusting unit includes a plural luminance shift image generating function which, when a plurality of different background luminance levels based on the luminance histogram are set, generates luminance shift images corresponding to each of the set background luminance levels.

3. The image target identification device as claimed in claim 1, wherein the luminance calculation processing unit includes a subtraction processing module which performs subtraction processing as the calculation processing and, by performing the subtraction processing, generates the calculation processed image by subtracting a luminance value of each pixel in one image out of the luminance shift image and the reversed shift image from a frequency value of a corresponding pixel in the other image.

4. The image target identification device as claimed in claim 1, wherein
the luminance calculation processing unit includes a division processing module which performs division processing as the calculation processing, and, by performing the division processing, generates the calculation processed image by dividing a frequency value of each pixel in one image out of the luminance shift image and the reversed shift image by a luminance value at which the frequency of the luminance value becomes maximum, of a corresponding pixel in the other image.

5. The image target identification device as claimed in claim 1, wherein
the luminance calculation processing unit includes: a subtraction processing module which generates the calculation processed image by performing subtraction processing which subtracts a luminance value of each pixel in one image out of the luminance shift image and the reversed shift image from a frequency value of a corresponding pixel in the other image; and
a division processing module which generates the calculation processed image by performing division processing which divides a frequency value of each pixel in one image out of the luminance shift image and the reversed shift image by a luminance value at which the frequency of the luminance value becomes maximum, of a corresponding pixel in the other image.

6. The image target identification device as claimed in claim 1, comprising:
a filtering processing unit which generates a filtering image by eliminating the luminance of the pixel in a luminance region less than the luminance frequency set in advance in the calculation processed image;
a contrast expansion unit which performs expansion processing of a contrast of the filtering image based on the luminance values contained in the filtering image; and
a binarization processing unit which performs processing for binarizing the pixels of the luminance levels of equal to or more than a specific value in the calculation processed image.

7. An image target identification method which collects infrared rays from a filming target containing a target object and generates a calculation processed image in which the target object is displayed with emphasis based on an infrared image generated from the collected infrared rays based on a temperature of the captured object, the method comprising:
generating a luminance histogram showing appearance frequency of luminance values of pixels contained within the infrared image;
setting a luminance value corresponding to a peak value of the appearance frequency in the luminance histogram as a background luminance level which shows a luminance level of a background in the infrared image;
setting the background luminance level to an intermediate value of a luminance range width of the infrared image, and generating a luminance shift image in which each of other luminance values in the infrared image is shifted linearly by maintaining a contrast relation with respect to the background luminance level that is set to the intermediate value;
generating a reversed shift image in which the luminance levels of the luminance shift image is reversed; and
generating the calculation processed image by performing calculation processing for expanding the luminance difference between the target object and the background based on the reversed shift image and the luminance shift image.

8. An non-transitory computer readable recording medium storing an image target identification program for collecting infrared rays from a filming target containing a target object and generating a calculation processed image in which the target object is displayed with emphasis based on an infrared image generated from the collected infrared rays based on a temperature of the captured object, the program causing a computer to execute:
a luminance histogram calculation function which generates a luminance histogram showing appearance frequency of luminance values of pixels contained within the infrared image;
a background luminance level determination function which sets a luminance value corresponding to a peak value of the appearance frequency in the luminance histogram as a background luminance level which shows a luminance level of a background in the infrared image;
a luminance level adjusting function which sets the background luminance level to an intermediate value of a luminance range width of the infrared image, and generates a luminance shift image in which each of other luminance values in the infrared image is shifted linearly by maintaining a contrast relation with respect to the background luminance level that is set to the intermediate value;
a reversed shift image generating function which generates a reversed shift image in which the luminance level of the luminance shift image is reversed; and
a luminance calculation processing function which generates the calculation processed image by performing calculation processing for expanding the luminance difference between the target object and the background based on the reversed shift image and the luminance shift image.

9. An image target identification device, comprising: optical means for collecting infrared rays from a filming target containing a target object and acquiring a specific wavelength band from the collected infrared rays; non-cooled infrared image sensor means for generating an infrared image corresponding to a temperature of the filming target based on the wavelength acquired by the optical means; and image processing means for generating a calculation processed image in which the target object is displayed with emphasis based on the infrared image, wherein
the image processing means comprises:
luminance histogram calculation means for generating a luminance histogram showing appearance frequency of luminance values of pixels contained within the infrared image;
background luminance level setting means for setting a luminance value corresponding to a peak value of the appearance frequency in the luminance histogram as a background luminance level which shows a luminance level of a background in the infrared image;
luminance level adjusting means for setting the background luminance level to an intermediate value of a luminance range width of the infrared image, and generating a luminance shift image in which the luminance value of the target object in the infrared image is shifted linearly by maintaining a contrast relation with respect to the background luminance level that is set to the intermediate value; and
luminance calculation processing means for generating a reversed shift image in which the luminance level of the luminance shift image is reversed, and generating the calculation processed image by performing calculation processing for expanding the luminance difference between the target object and the background based on the reversed shift image and the luminance shift image.

* * * * *